R. E. HELLMUND.
COMPOUNDING SYSTEM FOR PHASE CONVERTERS.
APPLICATION FILED AUG. 30, 1916.
1,284,331.
Patented Nov. 12, 1918.
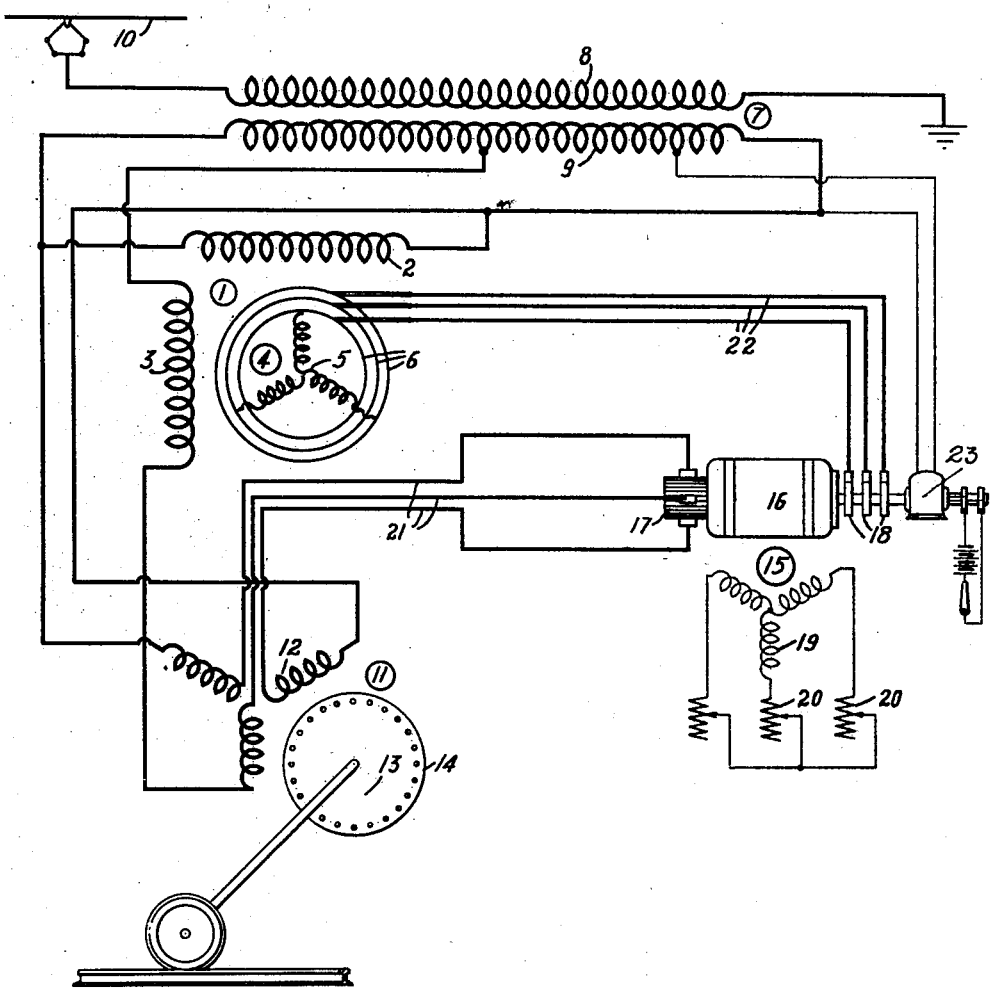
WITNESSES:
Fred. A. Lind.
O. C. Davis.
INVENTOR
Rudolf E. Hellmund
BY
Wesley G. Carr
ATTORNEY

UNITED STATES PATENT OFFICE.

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

COMPOUNDING SYSTEM FOR PHASE-CONVERTERS.

1,284,331.     Specification of Letters Patent.     Patented Nov. 12, 1918.

Application filed August 30, 1916. Serial No. 117,641.

*To all whom it may concern:*

Be it known that I, RUDOLF E. HELLMUND, a subject of the Emperor of Germany, and a resident of Swissvale, in the county of Allegheny and State of Pennsylvania, have invented a new and useful Improvement in Compounding Systems for Phase-Converters, of which the following is a specification.

My invention relates to compounding systems for phase-converters and phase balancers, and it has for its object to provide a system of the character designated that shall embody apparatus of standard type and that shall be simple and effective in operation throughout a wide range of load.

The single figure of the accompanying drawing is a diagrammatic view of a phase-converter, together with certain auxiliary apparatus, arranged to embody a preferred form of my invention.

In my copending application, Serial No. 108,567, filed July 11, 1916, I disclose means whereby the rotor winding of a phase-converter of the rotary type is energized with double-frequency exciting currents to compensate for both the ohmic and the reactive drops in the primary and secondary stator windings and in the rotor winding. By this means, the output voltage of the phase-converter may be caused to assume any desired compounding characteristic.

In the systems disclosed in the aforementioned application, I employ exciting machines which derive double-frequency currents from the rotor windings of the phase-converter, and, in turn, return double-frequency exciting currents thereto of proper phase and magnitude to produce the desired compounding effect. In the system of the present invention, I employ a frequency-changer of well known type, energizing one end of said frequency-changer from the load circuit of the phase converter and connecting the other end thereof to the rotor windings of said phase-converter. By rotating said frequency-changer at proper speed, the energy derived from the load circuit of the phase-converter is properly altered in frequency and is supplied to the rotor windings of the said phase-converter for the excitation thereof. By deriving the exciting energy from the load circuit, in the manner described, the degree of excitation varies with the load, as is desirable for proper compounding.

Referring to the drawing for a more detailed understanding of my invention, I show a phase-converter of a well known type at 1. Said phase-converter embodies a stator primary winding 2, a stator secondary winding 3, and a rotor member 4 supplied with a three-phase, Y-connected winding 5, the terminals of which are connected to suitable slip-rings 6.

Energy for the operation of the system is derived from any suitable source such, for example, as a transformer 7, comprising a primary winding 8 and a secondary winding 9, the primary winding 8 being energized from a trolley 10.

Energy derived directly from the secondary winding 9, in conjunction with that derived from the T-connected secondary winding 3 of the phase-converter 1, is supplied as polyphase current to a suitable load 11, such, for example, as an induction motor. Said load motor constitutes a stator winding 12, and a rotor 13, provided with a squirrel-cage winding 14 of ordinary form.

A frequency-changer 15 is provided for exciting purposes and includes an armature 16 and a stator winding 19, which is inductively energized and is closed through an adjustable resistor 20—20, in the manner described and claimed in a copending application of F. W. Meyer, Serial No. 741,458, filed Jan. 11, 1913, and assigned to the Westinghouse Electric & Manufacturing Company, which has issued as Patent No. 1,235,583, Aug. 7, 1917. The armature 16 is provided with a commutator 17 at one end and with slip-rings 18 at the other end, the winding of said armature being connected to said commutator and slip rings in an appropriate manner.

The commutator 17 embodies three equi-spaced sets of brushes which are connected into the load circuit of the phase-converter 1 by suitable mains 21. In like manner, the slip-rings 18—18 of the frequency changer 15 are connected to suitable brushes on the slip-rings 6—6 of the phase-converter 1 by suitable mains 22—22.

The frequency-changer 15 is driven at suitable speed by a synchronous motor 23.

Having thus described the general ar- rangement of a system embodying my invention, the operation is as follows: Upon energizing the phase-converter 1, the load circuit of the motor 11 is energized, and the load current flows into the rotor 16 through the commutator 17. The speed of rotation of the armature 16 is determined by the motor 23 so that the output frequency of the machine 15 is twice the input frequency thereof. The current supply from the slip-rings 18 is thus suitable for application to the rotor winding 5 for the compounding thereof, in accordance with the disclosure of my aforementioned application. As the load on the motor 11 changes with the adjustment of the control system thereof and with alterations in the train-weight or of the track-grade, the double-frequency excitation supplied to the rotor 4 varies accordingly, providing the desired automatic compounding effect. I have shown the frequency-changer 15 provided with a driving motor, but, obviously, I may employ any other well known form, such, for example, as the self-driving type, without departing from the spirit of my invention.

While I have shown my invention in this particular form, it will be apparent to those skilled in the art that it is susceptible of other minor changes and alterations without departing from the spirit thereof, and I desire, therefore, that only such limitations shall be placed thereupon as are imposed by the prior art or specifically set forth in the appended claims.

I claim as my invention:

1. The combination with a source of single-phase alternating current, of a phase-converter of the dynamo-electric type connected thereto and comprising primary, secondary and tertiary windings, a load circuit connected to derive polyphase currents jointly from said source and from said tertiary winding, and frequency-changing apparatus connected in said load circuit and further connected to said secondary winding, whereby currents may be supplied to said secondary winding at other than the frequency of said source and in substantial proportion to said load.

2. The combination with a source of single-phase alternating current, of a phase-converter of the dynamo-electric type connected thereto and comprising primary, secondary and tertiary windings, a load circuit connected to derive polyphase currents jointly from said source and from said tertiary winding, and frequency-changing apparatus adapted to double the frequency of currents supplied thereto connected in said load circuit and further connected to said secondary winding, whereby currents may be supplied to said secondary winding at double the frequency of said source and in substantial proportion to said load.

3. The combination with a source of single-phase alternating current, of a phase-converter comprising primary and tertiary windings disposed in electrical space-quadrature, a secondary winding mounted for relative movement with respect thereto, connections from said source to said primary winding, a polyphase load circuit, connections from said source and said tertiary winding to said load circuit, a two-to-one frequency-changer connected in said load circuit, and connections from said frequency-changer to said secondary winding, whereby currents may be supplied thereto having twice the frequency of said source and variable in substantial proportion to said load.

4. The combination with a source of single-phase alternating current, of a phase-converter comprising primary and tertiary windings disposed in electrical space-quadrature, a secondary winding mounted for relative movement with respect thereto, connections from said source to said primary winding, a polyphase motor, connections from said source and said tertiary winding to said motor, a two-to-one frequency-changer, said motor connections being extended through said motor to the low-frequency terminals of said frequency-changer, and connections from the high-frequency terminals of said frequency-changer to said secondary winding, whereby currents may be supplied thereto having twice the frequency of said source and variable in substantial proportion to said load.

In testimony whereof, I have hereunto subscribed my name this 25th day of August, 1916.

RUDOLF E. HELLMUND.